United States Patent [19]
Walker

[11] 4,172,800
[45] Oct. 30, 1979

[54] DRILLING FLUIDS CONTAINING AN ADMIXTURE OF POLYETHOXYLATED, SULFURIZED FATTY ACIDS AND POLYALKYLENE GLYCOLS

[75] Inventor: Thad O. Walker, Humble, Tex.

[73] Assignee: Texaco Inc., White Plains, N.Y.

[21] Appl. No.: 849,369

[22] Filed: Nov. 7, 1977

Related U.S. Application Data

[63] Continuation-in-part of Ser. No. 698,434, Jun. 21, 1976, abandoned.

[51] Int. Cl.$^2$ .............................................. C09K 7/02
[52] U.S. Cl. .................................. 252/8.5 C; 252/49.3
[58] Field of Search ............... 252/8.5 C, 8.5 P, 48.6, 252/49.3, 52 R

[56] References Cited

U.S. PATENT DOCUMENTS

| | | | |
|---|---|---|---|
| 2,589,949 | 3/1952 | Meadors | 252/8.5 |
| 3,014,862 | 12/1961 | Tailleur | 252/8.5 |
| 3,027,324 | 3/1962 | Rosenberg | 252/8.5 |
| 3,761,410 | 9/1973 | Mondshine et al. | 252/8.5 |
| 3,822,299 | 7/1974 | Lukeman et al. | 252/48.6 |
| 3,847,828 | 11/1974 | Latos | 252/49.3 |

*Primary Examiner*—Herbert B. Guynn
*Attorney, Agent, or Firm*—Thomas H. Whaley; Carl G. Ries; James F. Young

[57] ABSTRACT

Aqueous drilling fluids containing an admixture of a polyethoxylated sulfurized fatty acid and polyalkylene glycol. Such fluids are especially useful where reduced torque drilling fluids are needed. Another embodiment of this invention relates to a method of drilling utilizing the above-described fluids.

18 Claims, No Drawings

DRILLING FLUIDS CONTAINING AN ADMIXTURE OF POLYETHOXYLATED, SULFURIZED FATTY ACIDS AND POLYALKYLENE GLYCOLS

This application is a continuation-in-part application of application Ser. No. 698,434, filed June 21, 1976, now abandoned.

This invention relates to aqueous drilling fluids. More particularly, this invention relates to aqueous drilling fluids having incorporated therein a minor amount of an admixture of a polyethoxylated sulfurized fatty acid and a polyalkylene glycol as hereinafter more fully described. In another embodiment this invention is directed to an improved drilling operation employing the modified drilling fluids described above.

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethylcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of aqueous drilling fluids containing materials designed to increase the lubricity of these fluids have been proposed and used in the field, all of these modified drilling fluids suffer from one or more disadvantages.

In accordance with this invention an improved aqueous drilling fluid is provided by incorporating therein a minor amount of a water soluble or water dispersible admixture of a polyethoxylated sulfurized fatty acid and a polyalkylene glycol as hereinafter defined.

As used in the specification and in the accompanying claims, the expression "an admixture of a water soluble polyethoxylated sulfurized fatty acid and a polyalkylene glycol" refers to

A. FATTY ACID COMPONENT (1) An unsaturated fatty acid containing from about 14 to 18 carbon atoms therein such as myristoleic, the various hexadecenoic acids including palmitoleic, the various octadecenoic acids including oleic, elaidic, isoleic, linoleic, linolenic, elaeostearic, ricinoleic and the like; and (2) Wherein the polyethoxy content of each unsaturated fatty acid can vary from about 10 to about 13 moles of ethylene oxide, preferably between 10 and 12 thereof, per mole of the unsaturated fatty acid moiety; and (3) Wherein the sulfur content of the unsaturated fatty acid can vary from about 2 to about 6% by weight, based on the weight of the unsaturated fatty acid with the polyethylene oxide units and preferably about 3–5% by weight,

B. POLYETHYLENE GLYCOL COMPONENT

A water soluble polyalkylene glycol having an average molecular weight in the range of from about 300 to about 1200, preferably between about 400 and 1000, preferably a polyethylene glycol.

A drilling fluid of this invention may be prepared by the addition of a water soluble polyethoxylated sulfurized fatty and a polyalkylene glycol described above to an aqueous drilling fluid or to an aqueous drilling fluid containing a clay dispersed therein.

Polyethoxylated fatty acid precursors of the sulfurized water soluble fatty acid component of the admixture of the present invention are available commercially from Emergy Industries Inc., Cincinnati, Ohio under the trade designations Emerest 2646, 2647 and 2648. Sulfurization of the water soluble polyethoxylated fatty acid precursor was accomplished by known methods such as by heating the precursor to a temperature in the range of from about 150°–200° C. and adding thereto slowly the requisite amount of elemental sulfur and maintaining the resulting heated admixture for two hours followed by a cooling period to let the sulfurized product reach room temperature. This product was used.

The polyalkylene glycol component of the admixture is used in a weight ratio of from about 2 up to about 4 parts per part of the sulfurized polyethoxylated fatty acid component. In general it has been found necessary to maintain the glycol-fatty acid ratio at 2 or more parts by weight of the glycol per part by weight of the fatty acid component so as to maintain the rheology of the drilling fluid within acceptable limits.

The amount of the admixture of the water soluble polyethoxylated sulfurized fatty acid and polyalkylene glycol added to the well drilling of the invention is a minor but sufficient amount to substantially increase the lubricity of the said drilling fluid as measured, for example, by torque reduction. The amount to be added to the well drilling fluid is in the range of from about 0.5 to about 5 pounds thereof, per barrel of drilling fluid, preferably from about 1 to about 2 pounds per barrel.

It has been found that the drilling fluids containing the novel additives of the present invention exhibit a high degree of lubricity with little or no abnormal distortion of mud properties. Moreover the drilling fluids do not generate an abnormal amount of foam, so that any foaming can be controlled by the use of conventional defoamers which are compatible with drilling fluid systems. The drilling fluids containing the novel additives of this invention show tolerance and stability over wide ranges in pH and electrolyte concentrations and they perform satisfactorily in the various mud systems (i.e. drilling fluid systems) in general use today, e.g., low pH, salt water, as well as nondispersed and inhibitive mud systems.

An aqueous drilling fluid, the Base Mud in the following Tables, was prepared using a top hole mud from the West Cote Blanche Bay Field, St. Mary Parish, La., which was treated with 6 pounds per barrel of the ferrochrome lignosulfonate dispersant "Q-Broxin", its pH raised to about 9.5 with caustic, and aged overnigh at 150° F. before use.

There was added thereto varying amounts of the admixture of the water soluble polyethoxylated sulfurized fatty acid and the polyalkylene glycol. The physical properties of the resultant drilling fluids in terms of lubricity and drilling fluid rheology were measured using a lubricity tester.

TEST PROCEDURE

A machine was designed to simulate borehole conditions. The torque on a steel shaft rotating in a formation type core in the presence of a circulating drilling fluid was measured.

The torque produced by dry friction is considered to be linearly dependent on the normal force independent of velocity area, and fluid properties such as plastic viscosity and yield point.

Viscous friction is caused by viscous drag of the shaft rotating in the circulating mud system. This type of drag is proportional to the surface area; and depends upon velocity, and film thickness which together can be considered as the velocity gradient; and depends on fluid properties such as plastic viscosity and yield point. Viscous drag is dependent on the normal force only in an indirect manner through its effect on the film thickness. That is, increasing the normal force decreases the film thickness which in turn increases the velocity gradient thus increasing the required torque.

The major components of the test machine consist of a steel shaft turned by a cradle mounted motor with a Zero-Max (0–800 rpm) speed control, and a swivel mounted core. The motor was arranged so torque readings could be taken on a spring scale attached to the end of a lever arm.

The core is mounted on a bracket which pivots about a stationary point on one end. A cable is attached to the other end of the bracket. This cable runs over a pulley and weights are hung on the end. From a balance of moments and forces, the load on the pulley or applied load can be related to the load on the shaft or the normal force holding the shaft and core in contact.

To torque-load relation for the laboratory machine is linear. Thus the dry friction model adequately described the process under consideration, and the change of the coefficient of friction between the base mud and the treated mud runs gives an indication of the effectiveness of the additive under consideration.

The results obtained are reported as % Reduction in Torque.

The results were recorded and are summarized in the following tables.

TABLE I

| Example | Concentration (lbs/bbl) | Additives | %S | Reduction In Torque | P.V. | Drilling Fluid Rheology Y.P. | pH |
| --- | --- | --- | --- | --- | --- | --- | --- |
| Base Mud A* | — | — | — | — | 19.5 | 0 | 9.6 |
| 1 | 0.5 | Emerest 2646** | — | 0 | — | — | — |
| 2 | 1.0 | " " | — | 9.9 | — | — | — |
| 3 | 0.5 | " " | 2 | 17.3 | — | — | — |
| 4 | 1.0 | " " | 2 | 25.0 | 22.5 | 26 | 9.6 |
| 5 | 0.5 | " " | 4 | 26.2 | — | — | — |
| 6 | 1.0 | " " | 4 | 30.0 | 23.5 | 27 | 9.7 |
| 7 | 0.5 | " " | 6 | 13.5 | — | — | — |
| 8 | 1.0 | " " | 6 | 17.9 | — | — | — |
| 9 | 0.5 | " 2660*** | — | 0 | | | |
| 10 | 1.0 | " " | — | 0 | | | |
| 11 | 0.5 | " " | 2 | 0 | | | |
| 12 | 1.0 | " " | 2 | 0 | | | |
| 13 | 0.5 | " " | 4 | 8.0 | | | |
| 14 | 1.0 | " " | 4 | 19.0 | 19.5 | 32 | 9.6 |
| 15 | 0.5 | " " | 6 | 3.0 | | | |
| 16 | 1.0 | " " | 6 | 9.1 | | | |

*Base Mud A is described above.
**Emerest 2646 Polyethoxylated oleic acid with 10 ethylene oxide groups.
***Emerest 2660 Polyethoxylated oleic acid with 14 ethylene oxide groups.

The data presented in Table I above show that ethoxylated fatty acids alone (Examples 1, 2, 9 and 10) are ineffective as lubricity additives or (Ex. 2) less than 10% effective, as measured by the % reduction in torque.

The data obtained with sulfurized ethoxylated fatty acids (Examples 4–8) indicate some improvement in lubricity but concomitantly the rheology of the drilling fluids have been substantially impaired. These data indicate the sulfurized ethoxylated fatty acid materials are likewise unsatisfactory as lubricity additives. The data in the Table further show the criticality of the ethylene oxide content of the fatty acid, both unsulfurized and sulfurized (Examples 9–16) using the 14 mole ethylene oxide oleic acid material Emerest 2660, resulted in little or no beneficial effects in terms of lubricity or satisfactory rheology properties, except for Example 14.

TABLE II

| Example | Concentration (lbs/bbl) | Additive | %S | Conc. (lbs/bbl) of Glycol and M. W. | Reduction In Torque | P.V. | Drilling Fluid Rheology Y.P. | pH |
| --- | --- | --- | --- | --- | --- | --- | --- | --- |
| Base Mud | — | — | — | — | — | 10.5 | 1 | 9.5 |
| 17 | 0.5 | Emerest 2646* | 2 | — | | 12.5 | 20 | 9.6 |
| 18 | 0.5 | " " | 2 | 1# PEG 400 | 19.5 | 13.5 | 13 | 9.5 |
| 19 | 0.5 | " " | 2 | 1# PEG 600 | | 4.5 | 11 | 9.5 |
| 20 | 0.5 | " " | 2 | 1# PEG 1000 | | 13 | 10 | 9.6 |
| 21 | 1.0 | " " | 2 | — | | 16 | 23 | 9.5 |
| 22 | 1.0 | " " | 2 | 2# PEG 400 | 22.5 | 18.5 | 15.5 | 9.5 |
| 23 | 1.0 | " " | 2 | 2# PEG 600 | | 15.5 | 11.5 | 9.6 |

TABLE II-continued

| Example | Concentration (lbs/bbl) | Additive | | %S | Conc. (lbs/bbl) of Glycol and M. W. | Reduction In Torque | P.V. | Drilling Fluid Rheology Y.P. | pH |
|---|---|---|---|---|---|---|---|---|---|
| 24 | 1.0 | " | " | 2 | 2# PEG 1000 |  | 17 | 11.5 | 9.6 |
| 25 | 0.5 | " | " | 4 | — |  | 14 | 20 | 9.6 |
| 26 | 0.5 | " | " | 4 | 1# PEG 400 | 23.9 | 15 | 14 | 9.8 |
| 27 | 0.5 | " | " | 4 | 1# PEG 600 |  | 15.5 | 14.5 | 9.5 |
| 28 | 0.5 | " | " | 4 | 1# PEG 1000 |  | 15 | 13.5 | 9.6 |
| 29 | 1.0 | " | " | 4 | — |  | 16 | 23 | 9.6 |
| 30 | 1.0 | " | " | 4 | 2# PEG 400 | 31.5 | 16 | 22 | 9.6 |
| 31 | 1.0 | " | " | 4 | 2# PEG 600 |  | 17.5 | 14 | 9.6 |

Emerest 2646* See Table I

The data in Table II above show that satisfactory lubricity values and drilling fluid rheology are obtained by the novel additive admixtures of the present invention. In all instances, except for Examples 17, 21, 25 and 29, the drilling fluid rheology was within acceptable limits in terms of Plastic Viscosity and Yield Point values and the lubricity properties obtained were good, ranging from 19% to 31.5% reduction in torque (Examples 18, 22, 26 and 30).

I claim:

1. An aqueous drilling fluid consisting essentially of an aqueous phase containing clay solids dispersed therein by a ferrochrome lignosulfonate and containing an admixture of a water soluble polyethoxylated sulfurized unsaturated fatty acid containing from about 14 to about 18 carbon atoms and wherein the number of ethylene oxide groups therein is on an average of from about 10 to about 12 and wherein the sulfur content is from about 2 to about 6%, by weight, basis ethoxylated fatty acid moiety, and a water soluble polyethylene glycol having an average molecular weight in the range of from about 400 to about 1000, the ratio of said glycol to said polyethoxylated sulfurized fatty acid being from about 2 to about 4 parts by weight per part by weight of said fatty acid, said admixture being present in said drilling fluid in an amount of from about 0.5 to about 5 pounds per barrel and being effective to improve the lubricity of said drilling fluid without impairing its drilling fluid properties.

2. An aqueous drilling fluid as claimed in claim 1 wherein said admixture is present in said aqueous phase in an amount of from about 1 to 3 pounds per barrel.

3. An aqueous drilling fluid as claimed in claim 1 wherein said fatty acid is oleic acid.

4. An aqueous drilling fluid as claimed in claim 3 wherein the sulfur content of said fatty acid varies from about 3 to 5% by weight.

5. An aqueous drilling fluid as claimed in claim 1 wherein said fatty acid contains an average of about 10 ethylene oxide groups.

6. An aqueous drilling fluid as claimed in claim 1 wherein said glycol has an average molecular weight of from about 400 to about 600.

7. An aqueous drilling fluid as claimed in claim 6 wherein said glycol is polyethylene glycol 400.

8. An aqueous drilling fluid as claimed in claim 6 wherein said glycol is polyethylene glycol 600.

9. An aqueous drilling fluid as claimed in claim 6 wherein said glycol is polyethylene glycol 1000.

10. In a method of drilling wells wherein a drilling fluid is circulated in the well in contact with an earth formation during the drilling operation, the improvement which comprises contacting said earth formation with an aqueous drilling fluid consisting essentially of an aqueous phase containing clay solids dispersed therein by a ferrochrome lignosulfonate dispersant and containing an admixture of a water soluble polyethoxylated sulfurized unsaturated fatty acid containing from about 14 to about 18 carbon atoms and wherein the number of ethylene oxide groups therein is on an average of from about 10 to about 12 and wherein the sulfur content is from about 2 to about 6%, by weight, basis ethoxylated fatty acid moiety, and a water soluble polyethylene glycol having an average molecular weight in the range of from about 400 to about 1000, the ratio of said glycol to said polyethoxylated sulfurized fatty acid being from about 2 to 4 parts by weight per part by weight of said fatty acid, said admixture being present in an amount of from about 0.5 to about 5 pounds per barrel and being effective to improve the lubricity of said drilling fluid without impairing its drilling fluid properties.

11. A method as claimed in claim 10 wherein said admixture is present in said aqueous phase in an amount of from about 1 to 3 pounds per barrel.

12. A method as claimed in claim 10 wherein said fatty acid is oleic acid.

13. A method as claimed in claim 10 wherein the sulfur content of said fatty acid varies from about 3 to 5% by weight.

14. A method as claimed in claim 10 wherein said fatty acid contains an average of about 10 ethylene oxide groups.

15. A method as claimed in claim 10, wherein said glycol is a polyethylene glycol having an average molecular weight of from about 400 to about 600.

16. A method as claimed in claim 15 wherein said glycol is polyethylene glycol 400.

17. A method as claimed in claim 15 wherein said polyethylene glycol is polyethylene glycol 600.

18. A method as claimed in claim 10 wherein said glycol is polyethylene glycol 1000.

* * * * *